Nov. 28, 1961 E. M. ROSCHKE 3,011,016

SUBSCRIPTION RECEIVER

Filed June 29, 1959 3 Sheets-Sheet 1

INVENTOR
Erwin M. Roschke
BY Francis W. Crotty
ATTORNEY

Nov. 28, 1961 E. M. ROSCHKE 3,011,016

SUBSCRIPTION RECEIVER

Filed June 29, 1959 3 Sheets-Sheet 2

INVENTOR
Erwin M. Roschke
BY Francis W. Crotty
ATTORNEY

INVENTOR
Erwin M. Roschke
BY Francis W. Crotty
ATTORNEY

United States Patent Office 3,011,016

Patented Nov. 28, 1961

3,011,016

SUBSCRIPTION RECEIVER

Erwin M. Roschke, Des Plaines, Ill., assignor to Zenith Radio Corporation, a corporation of Delaware Filed June 29, 1959, Ser. No. 823,463

30 Claims. (Cl. 178—5.1)

The present invention is directed to a subscription receiver for utilizing an intelligence signal coded in accordance with a given coding schedule. More particularly, the invention concerns correlation in a subscription television receiver which has adjustable elements requiring precise adjustment in order that the receiver may produce an intelligible image in response to the received coded signal. Correlation is here used in the sense of a measure of the correctness of the adjustment of such elements in the receiver.

Subscription communication as a service for the public at large has been proposed and is presently contemplated for television in order that subscribers may have available for their selection and enjoyment a quality of program which experience has proved to be beyond the ability of current telecasting sponsored by advertising. Ideally, a subscription system should code the video information so well that the image reproduced on an unauthorized or non-subscriber's receiver in response to the coded video information is utterly unintelligible. Likewise, there should be destruction of the audio information through the transmission of a coded sound signal and the coding processes employed for both video and sound should be secure against pirating. This means that the coding techniques should have such complexity or sophistication as to render it impossible, as a practical matter, for unauthorized receivers to derive any appreciable amount of the transmitted intelligence by means of home-made or bootleg decoding devices or otherwise.

It has been suggested that a commercially acceptable system of subscription television may not require the perfection of such an ideal system. It may, for example, be entirely adequate to employ a rigidly secure type of coding for picture or sound and a much less secure type of coding, or perhaps even a mere scramble, for the other. Highly secure systems of both picture and sound coding have been developed; illustrative examples are described and claimed in the following patents and applications, all of which have been assigned to the assignee of the subject application: Patent 2,852,598, issued September 16, 1958, in the name of Erwin M. Roschke; Patent 2,843,656, issued July 15, 1958, in the name of George V. Morris; copending application Serial No. 796,026, filed February 27, 1959, and issued May 9, 1961 as Patent 2,983,782, in the names of Walter S. Druz; and copending application Serial No. 479,170, filed December 31, 1954, in the name of Erwin M. Roschke. At the same time systems that involve scrambling with a low degree of security suggest themselves readily to those skilled in the art.

An acceptable system developed on the aforementioned premise employs secure coding of the picture information and simple scrambling of the sound accomplished by the mere expedient of displacing the sound in the frequency spectrum by modulation or heterodyning. The reception of a subscription transmission in such a system is accomplished by a video decoder, that must be accurately adjusted or correlated to the coding schedule employed by the transmitter, plus an additional stage of demodulation for shifting the demodulated sound into its proper location in the frequency spectrum to achieve sound decoding. It is exceedingly desirable to arrange the receiver apparatus in such a way that this relatively simple sound decoding device is not permitted to function unless and until the video decoder has been properly set or adjusted to achieve decoding of the video portion of the subscription broadcast. This desired result can be attained by the structures described and claimed herein.

Another and distinctly different aspect of subscription television which is aided materially by the subject invention has to do with defeating, or making more difficult the task of those who would cheat the system by trial and error techniques. It will be appreciated that where a decoding device includes a number of adjustable elements to be set relative to one another in order to achieve decoding, there is at least a temptation to find the rosetta stone or correct setting of the decoder on a trial and error basis. Of course, if this effort should be successful, a subscriber would succeed in avoiding the obligation to make a payment for enjoying the subscription program. Trial and error adjustment of the decoder is not at all an easy task but it is suspected that the burden may possibly be eased through the observation of changes occasioned in the reproduced image as the trial and error process is pursued step by step. Should any help be derived from observation of the image, cheating may be made more difficult by arranging that the image shall not appear on the screen unless and until the decoding device has been conditioned as required to effect complete decoding. This objective is also realized through the present invention.

Accordingly, it is an object of the invention to provide an improved subscription receiver characterized by the fact that the responsiveness of a controlled device, such as an image reproducer, is determined by the degree of correlation represented by the instantaneous adjustment of the receiver.

It is another object of the invention to provide a subscription television receiver having sound and image reproducers at least one of which is effectively disabled unless and until those elements of the receiver which are to be precisely adjusted in accordance with the requirements of a given subscription program have, in fact, been so adjusted.

A secrecy communication receiver, constructed in accordance with one aspect of an invention, comprises signal-generating apparatus inluding a plurality of adjustable code-determining elements to be adjusted in accordance with a predetermined adjustment for developing a comparison signal having a characteristic determined, at least in part, by the instantaneous adjustment of the code-determining elements. There are means responsive to the comparison signal for effectively comparing the instantaneous adjustment of the code-determining elements with the aforesaid predetermined adjustment to derive a control effect indicating the correlation status therebetween. A controlled device is provided, along with means for utilizing the control effect to establish the controlled device in a predetermined operating condition during intervals in which the code-determining elements are adjusted in accordance with the aforesaid predetermined adjustment.

A subscription receiver, embodying the present invention in accordance with a further one of its aspects, for utilizing an intelligence signal coded in accordance with a given coding schedule comprises a controlled device, which may be signal reproducer, and which is established in a predetermined operating condition when the coded intelligence signal is being decoded. There is a decoding mechanism including a plurality of signal-translating elements that are adjustable relative to one another. There are means for applying the coded signal to the decoding mechanism and further means for deriving a first and second comparison signal. The first such signal has a waveform determined by the adjustment of the adjustable elements and the second has a waveform determined by those elements or by the coding schedule of the received signal. A comparison device is included in the receiver for deriving a control effect in response to the application or a pair of signals. There are other means for applying the aforesaid first and second signals to the comparison device to derive a control effect during intervals in which the instantaneous polarities of their waveforms have a predetermined relation to one another. Finally, means are provided for utilizing that control effect to establish the reproducer or other controlled device of the receiving system in the predetermined operating condition.

In accordance with another aspect of the invention, the video decoder has a plurality of code-determining elements which have to be adjusted to establish an operating condition properly correlated to the code of the received signal, and the control effect obtained when proper correlation has been established is employed to determine the responsiveness of the sound reproducer. Instead of controlling the reproducer, a charge or use meter may be operated by the control effect to the end that the subscriber is billed for program fare only if his instrument has been adjusted to use the program.

Another aspect of the invention contemplates that the control effect denoting precise decoding adjustment in relation to the code schedule of the received signal is required to effect reproduction of either sound or video information.

In one specific apparatus embodiment of the invention, the comparison device rseponds to a signal obtained from the decoding mechanism and to a signal obtained from the received program signal. The first of these signals represents the decoding schedule established in the decoding mechanism and the second represents the coding schedule of the program. Correlation is perfected when the signals compared have a particular or predetermined relation to one another. One convenient form of relation is that the two signals have the same polarity at the instant they are observed by the comparison device but, alternatively, the condition of correct correlation may require that the compared signals be of opposite polarity when observed in the comparison device.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 2, 7:
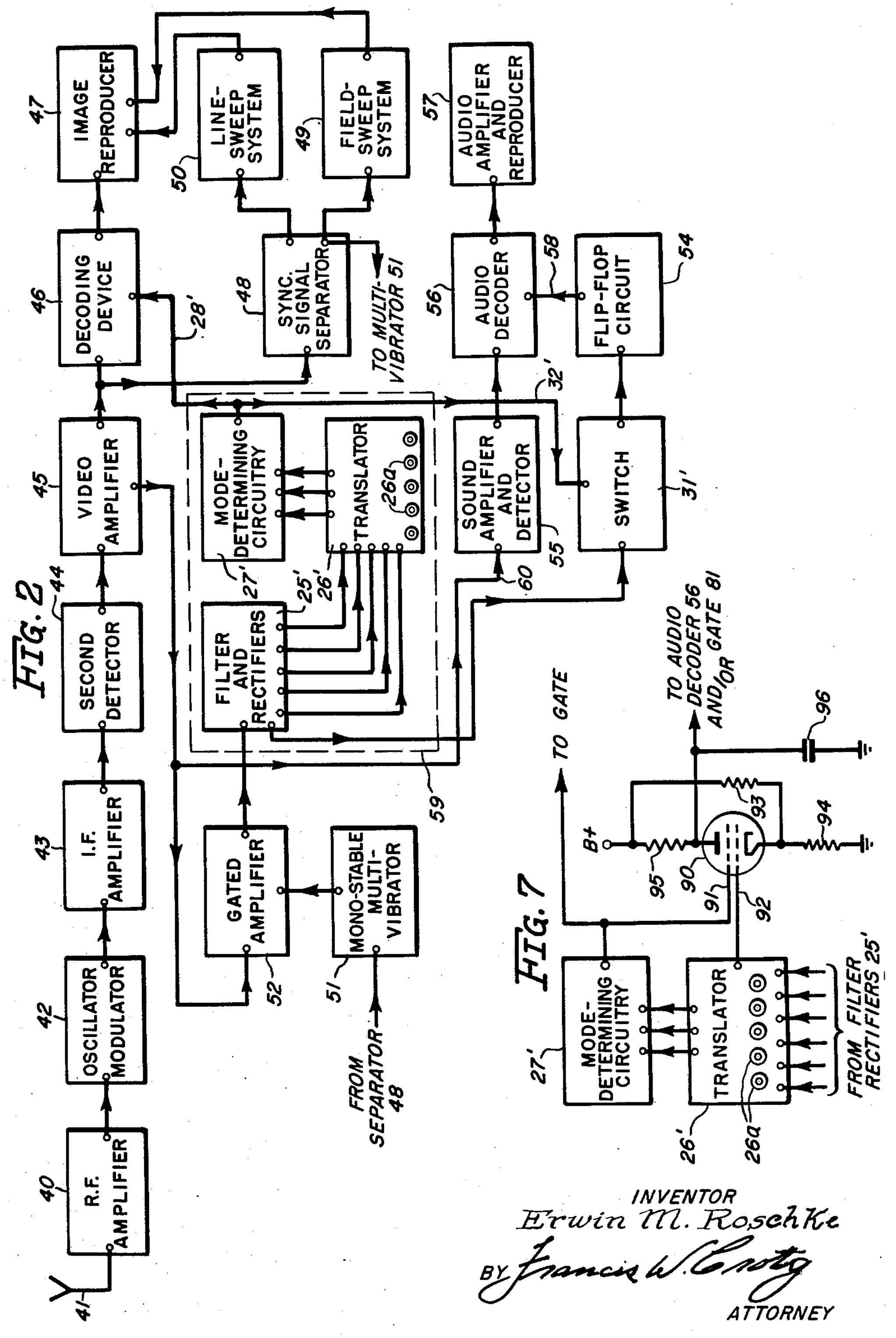
FIGURE 2 is a block diagram of a subscription receiver for utilizing the transmission of the arrangement of FIGURE 1 and embodying the present invention in one form.
Figure 5:
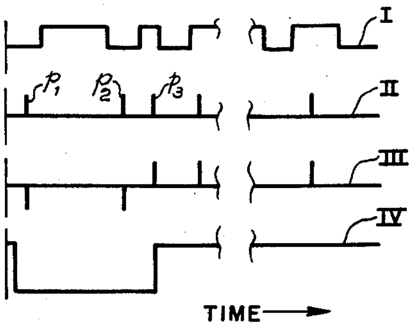
Figure 6:
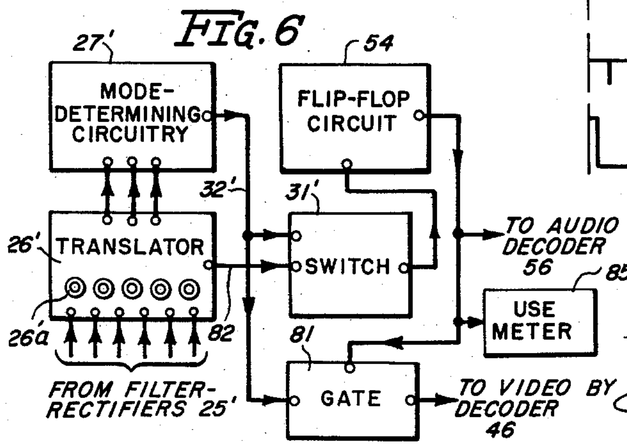

FIGURE 5 comprises a series of curves utilized in explaining the correlation technique of the receiver of FIGURE 2; and FIGURES 6 and 7 represent further modifications of the invention that may be employed in the receiver of FIGURE 2.

Figure 1:
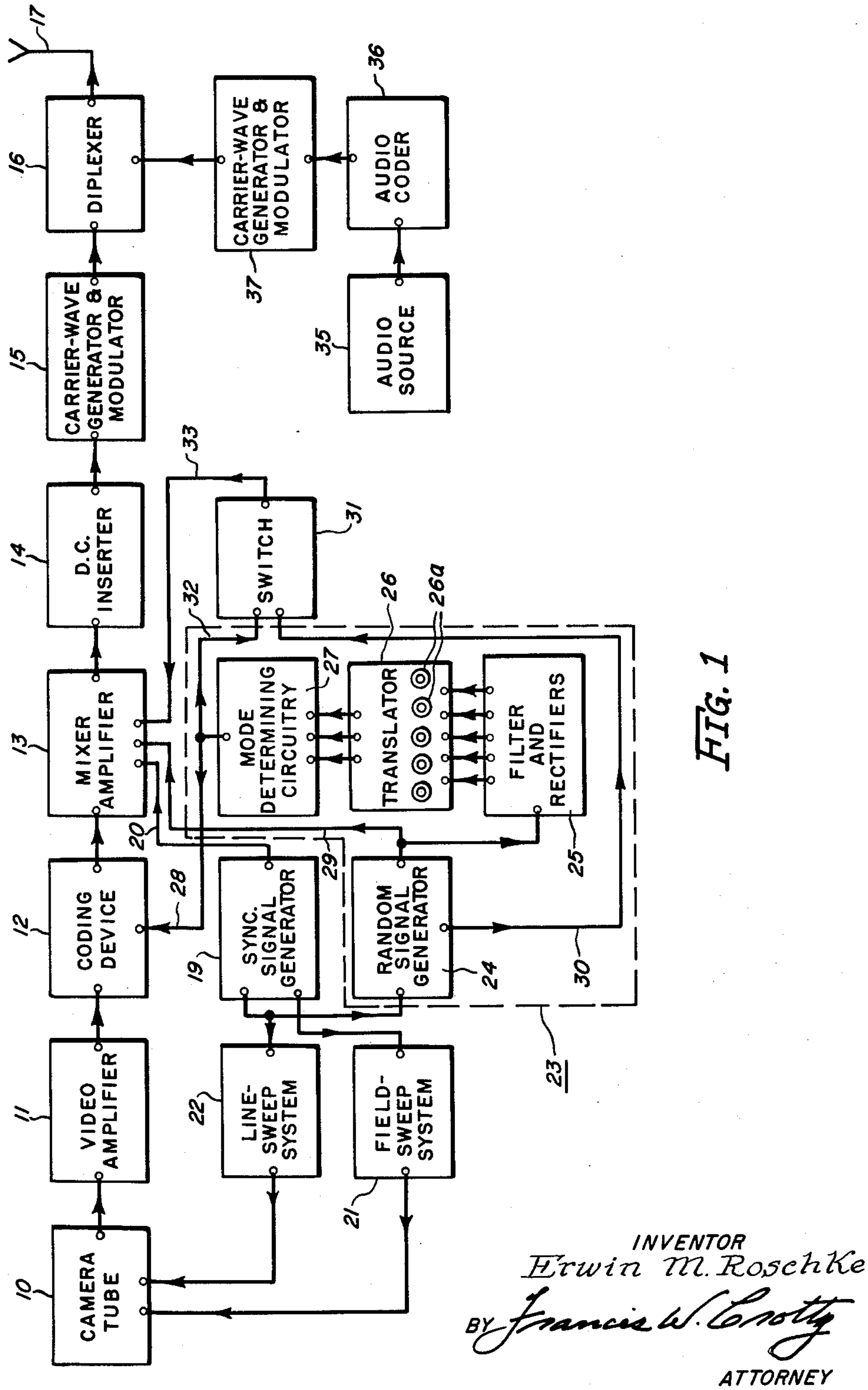
FIGURE 1 is a block diagram of a subscription television transmitter featuring coding of both video and audio information.

Referring now more particularly to FIGURE 1, the subscription television transmitter there represented includes a picture-converting device or camera tube 10 which may be an iconoscope, image orthicon or other well known type. The output terminals of the camera tube are connected through a video amplifier 11 and a coding device 12 to the input of a mixer amplifier 13. There are a number of ways in which the video signal may be coded but the specific type of coding employed has no relation, as such, to the invention. For convenience, coder 12 may be considered to be like that described and claimed in Patent 2,758,153, issued August 7, 1956, in the name of Robert Adler and assigned to the present assignee. It may comprise a beam-deflection tube having a pair of output circuits which may be selectively coupled into the video channel as the electron beam thereof is deflected from one to the other of two segmental anodes coupled to such output circuits. One of these circuits includes a time-delay network so that the timing of the video components relative to the synchronizing components of the radiated signal varies as the beam of the deflection tube is switched between its anodes. The deflection or switching of the electron beam is under the control of apparatus, to be identified presently, which develops a coding signal for application to the deflection electrodes of the beam-deflection tube included in coding device 12.

Mixer amplifier 13 is connected through a direct-current inserter 14 to a carrier-wave generator and modulator 15 which, in turn, is connected through a diplexer 16 to an antenna system 17. The transmitter further includes a synchronizing-signal generator 19 which supplies line and field-synchronizing components and associated pedestal components to mixer 13 by way of a connection 20. Generator 19 further supplies field and line-drive pulses to a field-sweep system 21 and to a line-sweep system 22, respectively. The output terminals of these sweep systems are connected to the line and field-deflection elements (not shown) customarily associated with camera tube 10.

The coding signal for application to coding device 12 is generated by means of an arrangement 23. The coding or deflection signal developed by this arrangement may effect deflection of the electron beam of the beam-deflection tube included within unit 12 at a faster-than-field rate or at a sub-field rate as desired. An arrangement for effecting deflection of the beam at a sub-field rate and therefore to establish mode changes within the system at a corresponding rate is described in detail and claimed in Patent 2,823,252, issued on February 11, 1958, in the name of J. E. Bridges, and assigned to the same assignee as the present invention. Reference may be had to that patent for the details of the circuitry. Suffice it to say here that the arrangement comprises a random signal generator 24 having a synchronizing or timing input coupled to the horizontal-drive output terminal of generator 19. The random signal generator is a device for developing bursts or pulses which occur in random order within an assigned group of code-signal frequencies. There may be six or seven such frequency assignments as described in the Bridges patent.

The output terminal of generator 24 is connected to a unit 25 comprising a series of filter and rectifier devices. Each filter is tuned to be resonant at an assigned one of the code-signal frequencies and is coupled to its rectifier to the end that a rectified pulse output is attained whenever a code burst corresponding to its frequency assignment appears in the output circuit of generator 24. The output terminals of the group of filter-rectifiers are connected to a like number of input terminals of a signal translator 26. This device in its simplest form is a bank of switches interposed between the input terminals of the translator so that as the switches are adjusted between their several operating positions, a selected pattern or permutation of connections is established through which the input terminals are connected in a chosen pattern to the output terminals. Of course, the pattern of connections may be varied or changed by manipulation of knobs *26a*, *26a* through which the operating positions of the switches are changed. There is one such knob for each switch of the bank.

The output terminals of translator 26 connect to input terminals of a unit 27 referred to as the mode-determining circuitry. One very simple form of this unit is a bistable or flip-flop circuit having a series of distinct inputs to which trigger pulses may be applied for the purpose of variously conditioning the flip-flop circuit as between its two possible operating states. In one operating state, one tube of the bi-stable circuit is fully conductive while the companion tube is substantially at cut-off and the alternate state reverses the conductivity of these tubes. An output connection 28 extends from the anode circuit of one such tube to the deflection electrodes of the beam-deflection tube of coder 12, supplying the signal developed at the anode of the selected tube as a coding signal of substantially rectangular waveform.

In order that decoding apparatus at the receiver, serving the complementary function of units 25, 26 and 27, may develop a decoding signal which is synchronized with and has the same waveform as the coding signal supplied to coder 12, the code-signal bursts developed in random signal generator 24 are delivered over a connection 29 to mixer amplifier 13.

One code-signal frequency developed in generator 24 is set aside for the purpose of permitting the receiver to determine the state of correlation between the adjustment established by the subscriber in connection with a particular subscription program and the code schedule of that program. This code burst of a pre-assigned frequency is delivered by a further connection 30, extending from generator 24 to one input terminal of a coincidence gate or switch 31. The other input terminal of this switch connects to mode-determining circuit 27, as represented by connection 32, and the output signal derived from the switch is delivered over a connection 33 to mixer amplifier 13. Aside from the correlating pulse assignment and circuitry and switch 31 through which this pulse is applied to mixer amplifier 13, the described transmitter is essentially the same as that of the aforesaid Bridges Patent 2,823,252, The sound program accompanying the video information is developed in an audio source 35 and is coupled through an audio coder 36 to a carrier-wave generator and modulator 37. The sound carrier bearing coded audio information is delivered to diplexer 16 for concurrent radiation with the picture carrier bearing the coded video information.

In operation, the cathode-ray beam of camera tube 10 scans a target or image area under the influence of deflection fields established in response to sweep signals delivered by sweep systems 21 and 22. Timing of these sweep signals is under the control of synchronizing-signal generator 19 in the usual way and the scansion occasioned within the camera tube takes the form of a series of interlaced fields individually having a number of parallel lines. In this fashion, an image focused upon the camera tube is converted into video-frequency signal components which are amplified in amplifier 11. Neglecting for the moment the function of coder 12, the video information is delivered to mixer amplifier 13 where it is mixed in conventional manner with the line and field-pedestals and synchronizing components and with the equalizing pulses in known manner. The signal output of mixer 13, under the assumed conditions, is a composite television signal of conventional waveform and specification. After D.C. insertion in unit 14, it is modulated on a picture carrier in unit 15 and delivered to diplexer 16 for radiation. Further neglecting for the moment the function of audio coder 36, the audio information from source 35 is modulated on a sound carrier in unit 37 and likewise delivered to diplexer 16 for transmission concurrently with the modulated picture carrier. As thus far described, the operation is strictly that of the conventional television transmitter.

For subscription operation, especially when the program signal is radiated to subscriber receivers, it is necessary to resort to coding so that non-subscriber receivers making use of the transmission experience unintelligible video and/or sound. For the case at hand, it will be assumed that one of the carrier signals, specifically the picture carrier, has a high degree of coding while the other, namely the audio carrier signal, has a less sophisticated type of coding and is merely scrambled. Coding of the video signal is accomplished in coder 12 under the influence of the coding signal delivered thereto from mode-determining circuit 27. This is a signal of rectangular waveform, changing from time to time and in random fashion between maximum and minimum amplitude levels and each such change actuates the beam-deflection tube in the video coder to change the time relation of the video and synchronizing information in order to achieve coding. The intervals in which the coding signal experiences amplitude excursions are determined by the code-signal frequencies generated in random order in generator 24, separated from one another and selected in filter-rectifiers 25 for application to translator 26. The pattern of connections established between the input and output terminals of this translator dictates the manner in which the generated code-signal bursts or frequencies are utilized or rejected in the mode-determining circuit 27, all of which is explained in the Bridges patent.

All of the code-signal frequencies or bursts utilized in controlling the mode-determining circuit are applied directly to mixer amplifier 13 for inclusion within the picture transmission. The bursts of the particular code-signal frequency assigned to correlation are likewise generated from time to time and in random order in generator 24 and are applied directly to switch 31. When the switch is open (assuming this takes place when the decoding signal of mode-determining circuit 27 is at a maximum amplitude), at the time a correlating code burst is delivered to the switch, that burst is admitted to mixer 13 for transmission to subscriber receivers. On the other hand, any time a correlating burst is delivered to switch 31 when the decoding signal is at a minimum amplitude level, the switch is closed and that correlating burst is not permitted to arrive at mixer amplifier 13. In other words, the correlating burst, when it appears in the transmitted signal, denotes that the mode-determining circuit of the transmitter has, at that instant, been in a particular one of its two possible operating modes or conditions. This is convenient antecedent information for determining the state of correlation of the receiver as explained hereinafter.

Let it be assumed that audio coder 36 is an elementary type of coding device which scrambles, as distinguished from codes, the audio signal. More specifically, scrambling is here used in the sense that the audio information is merely shifted in the frequency spectrum to a place where it normally does not reside and has only to be returned to its original frequency location to enable a sound reproducer to reproduce the sound program. Of course, until it has been so returned in the frequency spectrum the output of a speaker would be unintelligible speech or music. The function of audio coder 36 is to merely scramble the sound information before it is modulated on the sound carrier.

The subscription television receiver of FIGURE 2, which may utilize the telecast originating at the transmitter of FIGURE 1, comprises a radio-frequency amplifier 40 having input terminals connected to an antenna circuit 41 and output terminals connected to a first detector or oscillator modulator 42. The output terminals of detector 42 connect through an intermediate-frequency amplifier 43 to a second or video detector 44 which drives a video amplifier 45. One output terminal of amplifier 45 is coupled through a decoding device 46 to the input electrodes or an image reproducer 47 of the cathode-ray type. Decoder 46 is identical to video coder 12 at the transmitter except that its electron beam is deflected in a complementary fashion in order effectively to compensate for the variations in timing of the video vs. synchronizing components of a received subscription television signal.

Video amplifier 45 is also coupled through a synchronizing-signal separator 48 to a field-sweep system 49 and to a line-sweep system 50. The output terminals of these sweep systems connect respectively to field- and line-deflection coils (not shown) associated with reproducer 47.

Field-drive pulses derived from separator 48 are supplied to a mono-stable multi-vibrator 51, as indicated, and the output of the multi-vibrator connects to a normally-closed gated amplifier 52. An output terminal of video amplifier 45 is also connected to gated amplifier 52 to supply the composite video signal thereto and the output circuit of the gated amplifier connects to a filter and rectifier unit 25'. The output terminals of the filter-rectifiers which are selective to the code-signal frequencies employed in controlling mode-determination at the transmitter are coupled to a series of input terminals of a signal translator 26'. The output terminals of the translator connect to a mode-determining circuit 27' and the decoding signal developed therein is delivered over a connection 28' to video decoder 46. The control knobs **26*a*' of the translator determine the pattern of connections established through the associated filter-rectifiers of unit 25'** to the input and hence to the output terminals of the translator.

The filter-rectifier of unit 25' that is selective to the code-signal frequency assigned to the correlation pulse connects to an input terminal of a switch or a gated amplifier 31'. The gating circuit of this switch also receives the decoding signal by means of a connection 32' extending from unit 27'. The output circuit of the switch connects to a trigger or control circuit of a flip-flop device 54 of conventional design and construction. The purpose of the flip-flop will be made clear hereinafter.

Where the receiver is of the intercarrier type, an intercarrier component may be derived or selected in the output circuit of the video amplifier. This component is delivered to the sound amplifier and detector 55 by means of a connection 60. The output circuit of the sound detector connects through an audio decoder 56 to an audio amplifier and reproducer 57. Actuation of the audio decoder is under the control of flip-flop 54 as indicated by the connection 58 extending therebetween.

In considering the operation of the receiver, the functions of video decoder 46, the units embraced within broken-line rectangle 59, and audio decoder 56 will be neglected initially. A television signal intercepted by antenna 41 is amplified in radio-frequency amplifier 40 and heterodyned to the intermediate frequency of the receiver in oscillator-modulator 42. The intermediate-frequency signal is further amplified in amplifier 43 and detected in video detector 44. The video signal, after amplification in amplifier 45, is impressed on the input electrodes of image reproducer 47 to intensity modulate the cathode-ray beam therein.

The synchronizing components of the composite television signal are separated through separator 48, the field- and line-synchronizing components being applied to synchronize or time the operation of sweep systems 49 and 50, respectively. Their sweep signal outputs are utilized to energize the scanning yoke of the image reproducer to the end that the beam thereof traverses its target in a series of interlaced fields of parallel lines at the same time it is experiencing intensity modulation reflecting the video information. In this conventional manner, an image is synthesized. An intercarrier component which is frequency modulated with sound information is likewise obtained from video amplifier 45 and after amplification and detection in detector 55, is used to drive audio amplifier and reproducer 57.

Inasmuch as the signal transmitted has coded video information, it is necessary to modify the described operation to accomplish decoding. Accordingly, field-drive pulses from separator 48 supplied to multi-vibrator 51 gate amplifier 52 to admit to filter-rectifier unit 25' that portion of the composite television signal which embraces the code-signal bursts or frequencies. Their separation is accomplished in unit 25' and the code components are thereby delivered to the input terminals of translator 26' from which they are directed selectively to the output terminals of the translator in accordance with the pattern of connections established by adjustment of knobs **26*a*'. From the output terminals of the translator, the code bursts energize mode-determining circuit 27' to develop a decoding signal. So long as the adjustment of knobs 26*a*' establishes the pattern of connections between the input and output terminals of the translator required to apply the code-signal bursts to mode circuit 27 in precisely the same manner as that set up by manipulation of knobs 26*a* of the corresponding unit of the transmitter, the decoding signal matches the coding signal which is the necessary condition to control video decoder 46 to decode the picture signal. If it be assumed that audio decoder 56 is functioning, the scrambled audio information from detector 55 is shifted in the frequency spectrum by the audio decoder to return it to its appropriate location as required to accomplish audio unscrambling. Accordingly, sound reproducer 57 is able to reproduce the sound program. Aside from the operation of the audio decoder, this receiver, both as to significant circuitry and operating details, is fully explained in the Bridges patent referred to above and incorporated herein by reference. The function of switch 31' and flip-flop circuit 54** in controlling the sound decoder concerns the matter of correlation to be considered presently.

Figure 3:
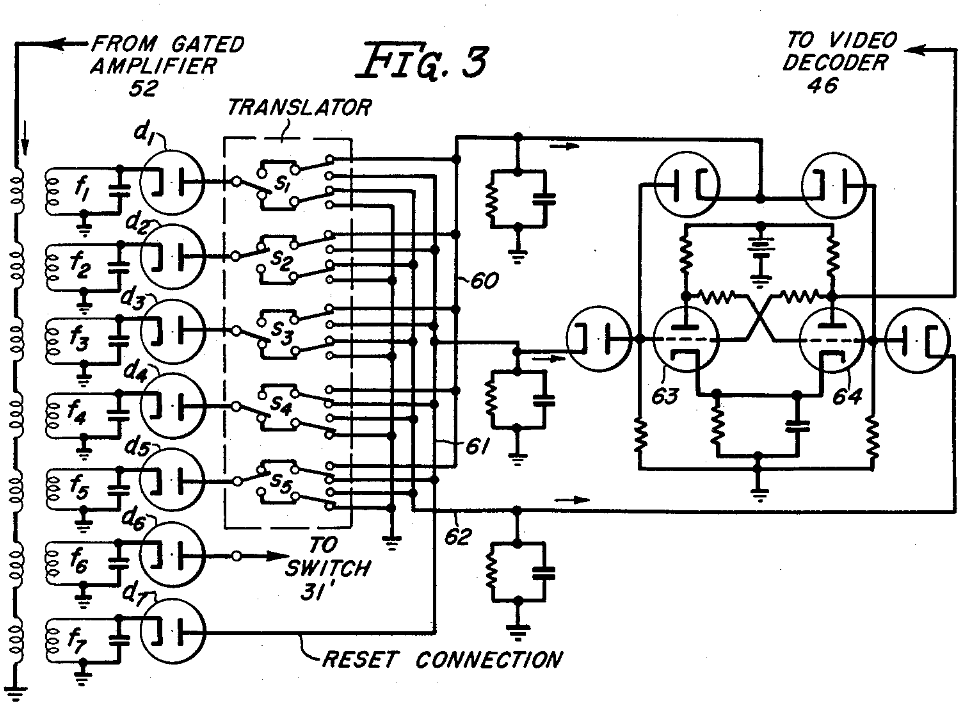
FIGURES 3 and 4 are schematic circuit diagrams of certain components of the receiver of FIGURE 2.

It will be apparent that much of the coding mechanism of the transmitter finds exact correspondence in the decoding mechanism of the receiver. In particular, the transmitter coding mechanism includes beam-deflection coding device 12, filter-rectifiers 25, translator 26 and mode-determining circuitry 27. Identical components of the receiver are video decoder 46, filter-rectifiers 25', translator 26', and mode-determining circuitry 27'. The schematic circuit diagram of FIGURE 3 is a reproduction of FIGURE 2 of Bridges Patent 2,823,252 and represents one acceptable form that the filter-rectifiers, translator and mode-determining circuitry may take.

Each of the filter-rectifiers comprises a tuned resonant circuit or selector which energizes a diode rectifier. The selectors are designated $f_1$ to $f_7$ and the diodes are designated $d_1$ to $d_7$. The translator is represented as a series of adjustable signal-translating switches or code-determining elements $s_1$ to $s_5$. There are three output buses from the translator shown as conductors 60, 61 and 62. The pattern of connections through the selectors and the input terminals of the translator to the output terminals thereof is a function of the settings of the individual switches $s_1$–$s_5$ and, accordingly, is a function of the adjustment of control knobs **26*a***.

The mode-determining circuit is a bi-stable arrangement of cross-coupled triodes 63, 64 and buses 60, 61, and 62 connect to locations of the bi-stable circuit which causes the triodes to respond to applied pulses and be triggered from one to the other of their two operating conditions, as explained in detail in the Bridges patent. Manifestly, the picture-signal component of the received subscription program is coded in accordance with a given coding schedule. That schedule is represented by the code schedule bursts or frequencies generated at random in the transmitter, used in determining the operation of the video coding device and included in the picture transmission for use at the receiver. The manually adjustable switches $s_1$–$s_5$ may be considered adjustable code-determining elements which collectively determine the coding schedule of the transmitter and likewise the decoding schedule of the receiver. Knobs **26*a*** are means for adjusting these elements relative to one another to the end that a selected coding schedule may be adopted at the transmitter while a precise decoding schedule may be established at the receiver to permit the receiver to utilize the selected subscription program.

When the decoding mechanism has been properly adjusted so that the decoding signal applied to video decoder 46 is exactly and precisely the same as the coding signal controlling video coder 12 of the transmitter, a necessary condition of correlation will have been established. The receiver of FIGURE 2 is arranged so that a necessary function of the receiver is not permitted to take place until such correlation exists. The picture or sound reproducer, either or both of the decoding arrangements, a use meter, or any controlled stage of the receiver may be effectively disabled until a condition of correlation has been satisfied. For the case at hand, the sound decoder does not function until the video decoder has been properly adjusted. To that end, the receiver includes means for deriving a pair of comparison signals having waveforms determined by the adjustment of the signal translating elements or switches $s_1$–$s_5$ and by the code schedule of the transmission. More specifically, this means is represented by the connection 32' through which a first signal is derived from mode-determining circuit 27' having a waveform which reflects and is determined by the adjustment of those switches. The second signal is derived from filter-rectifier unit 25'. For convenience of explanation it has been assumed that the code-signal frequency $f_6$ is the one assigned for correlating purposes. Accordingly, the code-signal bursts of this frequency constitute the signal delivered to switch 31' at the receiver. Since bursts of this frequency appear in the transmission only when the transmitter is in a particular one of its alternative operating modes, it reflects and is determined by the coding schedule of the transmission.

Figure 4:
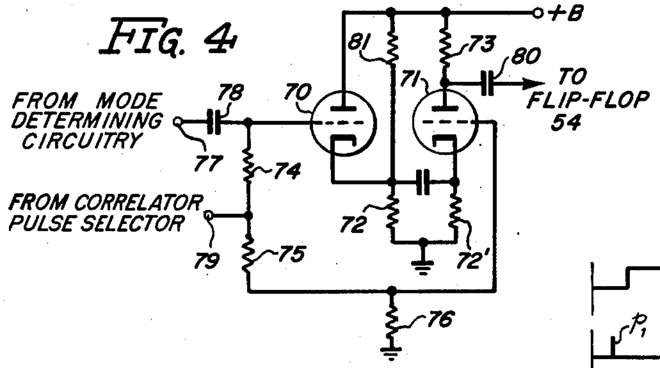

Switch 31' may be considered a comparison device which derives a control effect in response to the two signals which it receives from mode-determining circuit 27' and from filter-rectifiers 25'. One form of this switch is represented in FIGURE 4. It includes a pair of triode vacuum tubes 70, 71 having cathodes returned to ground through cathode resistors 72 and 72'. The anode of tube 70 connects to a source +B of excitation potential and the anode of the other tube is coupled to the same source through a resistor 73. The control electrodes of these tubes are connected together through a pair of resistors 74, 75 and are returned to ground through a common grid resistor 76. The decoding signal from mode-determining circuit 27' is applied to the triodes by way of an input terminal 77 which connects to the control electrodes through a coupling condenser 78. The correlation pulses from filter-rectifiers 25' are likewise applied to the triodes through a second input terminal 79 connected to the junction of resistors 74, 75. The control effect developed by the switch is derived in the anode circuit of tube 71 and is applied through a coupling condenser 80 to flip-flop circuit 54. Tube 70 is normally biased to cut off through a resistor 81 connected between its cathode resistor 72 and source +B.

The operation of the switch is demonstrated by the curves of FIGURE 5. Curve I represents the decoding signal from mode-determining circuit 27' and curve II includes a series of pulses individually representing a correlation pulse received as a component of the coded picture carrier. At the time the first pulse $P_1$ is received, the decoding signal is at its minimum amplitude level or is negative with respect to its A.C. axis. Tube 70 is now cut off and pulse $P_1$ which is concurrently applied to tube 71 is translated therethrough, appearing in its output circuit as a pulse of negative polarity as shown by curve III. The same conditions prevail at the time correlation pulse $P_2$ is received. It is assumed however that the adjustment of translator knobs 26a' has been modified by the time pulse $P_3$ is received, so that at this instant the decoding signal has its maximum amplitude level or it is positive relative to its A.C. axis. For this case, tube 70 conducts heavily during the pulse interval and the cathode follower action develops a positive pulse at the cathode of triode 71. This overwhelms the signal on the grid of tube 71 and results in the translation of correlation pulse $P_3$ as a pulse of positive polarity at the output circuit of tube 71. Where the transconductances of tubes 70 and 71 and the values of the circuit parameters associated therewith are properly selected, the pulses of curve III are of approximately equal amplitude but they change in polarity depending upon whether or not tube 70 conducts. If it be assumed that the translator is properly adjusted, the last described condition prevails at each occurrence of the correlation pulse, that is tube 70 conducts and translates the correlating pulse so that the signal developed in flip-flop circuit 54 has the waveform of curve IV.

The signal of curve IV has a minimum value or is negative relative to its A.C. axis if at the observation intervals when a correlation pulse is received, a condition exists in which that correlation pulse is opposite in polarity to the instantaneous polarity of the decoding signal. Alternatively, the signal developed by the flip-flop circuit has a maximum amplitude and is positive relative to its A.C. axis if the correlation pulse and the decoding signal from the mode-determining circuit are both of positive polarity at such intervals.

If the signal of curve III is delivered through an alternating current coupling device, such as a condenser, the flip-flop circuit is controlled. It assumes one of its two operating conditions when the signal is of negative polarity but assumes its other condition when the signal is of positive polarity. The heterodyning oscillator of the audio decoder is arranged to be excited only during operating intervals when the flip-flop circuit is under control of the positive polarity pulses from switch 31'. In other words, the audio decoder is, in effect, disabled except during those intervals in which the output signal (curve IV) of the flip-flop circuit is at a maximum amplitude level.

If the subscriber receives from the subscription system proper instructions for the adjustment of decoding knobs 26a', the correct pattern of connections is made immediately between filter-rectifiers 25' and mode-determining circuit 27'. The waveform of the decoding signal is immediately properly correlated to the wavefrom of the coding signal of the transmitter or, in other words, the coding and decoding schedules are precisely correlated. For these conditions, flip-flop 54 permits sound decoder 56 to operate and the subscriber enjoys correct and faithful reproduction of both the picture and sound signals even though they have been transmitted in coded or scrambled form. If the subscriber, on the other hand, seeks a trial and error method of adjustment of the translator, the great likelihood is that the initial adjustment of the translator will cause the polarity of the decoding signal at the time the correlating pulse is received to be incorrect in which event the flip-flop circuit is driven to disable the audio decoder. By happenstance, the subscriber may from time to time in the course of hunting and pecking arrive at an operating condition in which a correlating pulse will be received to cause the flip-flop circuit to turn the sound decoder on. The likelihood is that this will be but a transient condition and when the next correlating pulse is received, the decoder will again be turned off. Accordingly, complete decoding of the subscription program is dependent upon precise adjustment of translator 26' even though the scrambling of the sound portion is of low order security.

The correlating arrangement may be modified, in the manner of FIGURE 6, to derive both comparison signals for switch 31' from translator 26'. In this modification, the output terminals of the translator include not only those controlling mode-determining circuit 27' but also an output terminal through which the correlating pulse is delivered to switch 31' as represented by the connection 82. For this case, the correlation pulse is not delivered to switch 31' unless and until the selector which is responsive to the code-signal frequency assigned to correlation purposes is connected to the output terminal of the translator leading to the switch. Of course, that is dependent upon the manipulation of knobs 26a' which connect the selectors to the outputs of the translator. Thus, both comparison signals delivered to switch 31′ in this modification have waveforms determined by the pattern of connections established by manipulation of the control knobs which adjust the signal translating elements or code-determining elements of the video decoder.

Another distinguishing attribute of the embodiment of FIGURE 6 is that the output signal of flip-flop circuit 54 is delivered to a gate amplifier 81 through which the decoding signal developed in mode-determining circuit 27′ is supplied to video decoder 46. Accordingly, the action of the video decoder is controlled as is the audio decoder by the flip-flop circuit. In other words, the responsiveness of both the picture reproducer and the loud speaker are, in this case, subject to the operation of flip-flop circuit 54. Since the video decoder now receives the decoding signal only when gate 81 is properly operated by flip-flop circuit 54, a subscriber seeking to derive the proper setting of his translator by hunt and try receives substantially no help from visual observation of the changes in image reproduction as the translator control knobs are varied from one position to the next. Of course, it is recognized that there may be transient intervals even in the hunt and peck system in which the decoding signal will be permitted by gate 81 to reach the video decoder. For the most part, however, they will be very short intervals from which the trial and error advocate will derive little benefit.

A further feature of FIGURE 6 is that the output of circuit 54 is employed to actuate a use or charge meter 85. When a condition of correlation exists, indicating that decoding is taking place, use meter 85 records or registers that fact on a tape or other recording medium for charging purposes.

FIGURE 7 is similar to the embodiment of FIGURE 5 in that both comparison signals are derived through different output terminals of translator 26′. In this structure the comparison device is modified to take advantage of a concept which is described and claimed in a concurrently filed application of George V. Morris, Serial No. 823,401, issued October 25, 1959, as U.S. Patent No. 2,957,939, and assigned to the same assignee as the present invention. The Morris application recognizes the desirability in correlating schemes of the type under consideration of a structural arrangement such that a condition of inappropriate or non-correlation of the adjustment of the subscriber's apparatus to the coding schedule of the program results in the discharge of a condenser that has a very long time constant. If the operation of the signal-reproducing device, be it in the audio or video section of the receiver, is dependent upon the establishment of a certain charge condition in the condenser, then the trial and error advocate encounters another stumbling block; specifically, if discharge of the condenser occurs when a test of correlation is negative, the passage of a significant amount of time is required to charge the condenser again before further manipulation of the control knobs at the subscriber receiver can have any operative effect on the decoding. In the Morris application, one particular embodiment features the charge of that condenser in response to code-signal components of the received signal whereas in FIGURE 7 hereof the condenser is charged by a D.C. source within the receiver.

In particular, the comparison device is here shown as an electron discharge tube 90 which has two signal grids 91, 92, an anode and a cathode. It of course may have screening or other electrodes. The first control grid 92 connects to the output terminal of translator 26′ to which the selector that is responsive to the correlation pulse should be connected. The other grid 91 connects to the output circuit terminal of mode-determining circuit 27′. The tube is normally non-conductive because of a bias applied to its cathode through a voltage divider network of resistors 93 and 94 connected across a source B+ of unidirectional potential. The anode of the tube connects to the same source through a resistor 95. The anode-cathode circuit of the tube connects across an energy storing device or condenser 96 to provide a discharge path for that connection. The charging circuit for the condenser is from the source +B through resistor 95 and its time constant is, preferably, quite long as explained in the Morris application. For this arrangement, the voltage across the condenser may be applied to audio decoder 56 to permit the decoder to function during operating intervals in which the charge on the condenser exceeds a minimum or threshold value.

In operation, this circuit requires that the instantaneous polarity of the decoding signal waveform be opposite to that of the correlating pulse in order to retain tube 90 in its non-conductive state. Generally, the correlating pulse is of positive polarity and, if the condenser is to retain the charge established thereon from source B+, the operating mode of the decoding signal from unit 27′ must be such that the polarity of the signal applied to grid 91 is negative throughout the duration of the correlating pulse. Where this condition prevails, the tube remains cut off; otherwise positive polarity of the decoding signal at the time of the correlating pulse overcomes the cathode bias of the tube and renders it conductive. With the tube conductive, a discharge path for condenser 96 is completed and it has a very short time constant so that the condenser discharges very materially. The decoders or reproducers controlled by the voltage of the condenser are now rendered insensitive or unable to decode the transmission. Obviously, the control represented by changes in the charge condition of condenser 96 may be extended to the video decoder by having the condenser voltage control gate 81 in an arrangement similar to that represented in FIGURE 6.

It has been convenient in showing particular apparatus embodiments of the invention to test the state of correlation by examination of the decoding signal schedule of a decoder with respect to the coding schedule of the program. The control effect derived through the comparison has been illustrated as a control operating directly upon the decoders. It could also be applied additionally or alternatively to the reproducing device so that they are directly disabled unless and until a condition of correlation has been achieved. As described above, the control potential derived through the comparison may be applied to actuate any controlled device in the receiver be it a use or charge meter or portions of the sound and/or picture sections of the subscriber receiver. The arrangements disclosed render effective protection of the system against pirating through trial and error on the part of subscribers who have not actually subscribed to a particular program. They have the further advantage of permitting effective use of a subscription system which has a tight security, or a lock so to speak, on the coding of picture information even though the coding of the sound information is much less sophisticated and has a distinctly low order of security.

While there have been described particular embodiments of the invention, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A subscription receiver for utilizing an intelligence signal coded in accordance with a given coding schedule comprising: a controlled device established in a predetermined operating condition when said coded intelligence signal is being decoded; a decoding mechanism including a plurality of signal-translating elements adjustable relative to one another; means for applying said coded signal to said decoding mechanism; means for deriving a first comparison signal having a waveform determined by the adjustment of said signal-translating elements and for deriving a second signal having a waveform determined by said coding schedule of said coded signal; a comparison device for deriving a control effect in response to the application of a pair of signals; means for applying said first and second signals to said comparison device to derive a control effect during intervals in which the instantaneous polarities of the waveforms of said first and second signals have a predetermined relation to one another; and means for utilizing said control effect to establish said controlled device in said predetermined operating condition.

2. A subscription receiver for utilizing an intelligence signal coded in accordance with a given coding schedule and including code-signal bursts selected from a plurality of code-signal frequencies in an order related to said coding schedule, said receiver comprising: a signal reproducer; a decoding mechanism including a signal-translating device having a series of input terminals, a series of output terminals and a plurality of selectors each of which is responsive to an assigned one of said code-signal frequencies; adjustable means for making a pattern of connections from said input to said output terminals through said selectors and for varying said pattern of connections; means for applying said coded signal to said decoding mechanism; means for deriving a first comparison signal having a waveform determined by the pattern of connections established by said adjustable means and for deriving a second signal having a waveform determined by said coding schedule of said coded signal; a comparison device for deriving a control effect in response to the application of a pair of signals; means for applying said first and second signals to said comparison device to derive a control effect during intervals in which the instantaneous polarities of the waveforms of said first and second signals have a predetermined relation to one another; and means for utilizing said control effect to control the operation of said reproducer during said intervals.

3. A subscription receiver for utilizing an intelligence signal coded in accordance with a given coding schedule comprising: a controlled device established in a predetermined operating condition when said coded intelligence signal is being decoded; a decoding mechanism including a plurality of adjustable code-determining elements collectively determining the decoding schedule of said mechanism; means for adjusting said code-determining elements to vary the decoding schedule of said mechanism; means for applying said intelligence signal to said decoding mechanism; means for effectively comparing the decoding schedule of said mechanism to said coding schedule of said intelligence signal to derive a control effect representing the state of correlation of said schedules; and means for utilizing said control effect to establish said controlled device in said predetermined operating condition only during intervals of correct correlation of said schedules.

4. A subscription receiver for utilizing an intelligence signal coded in accordance with a given coding schedule comprising: a signal reproducer; a decoding mechanism including a plurality of adjustable code-determining elements collectively determining the decoding schedule of said mechanism; means for adjusting said code-determining elements to vary the decoding schedule of said mechanism; means for applying said intelligence signal to said decoding mechanism; means for effectively comparing the decoding schedule of said mechanism to said coding schedule of said intelligence signal to derive a control effect having one predetermined value during operating intervals in which said schedules are properly correlated but otherwise having another value; and means for utilizing said control effect to permit said reproducer to respond to said decoder during operating intervals in which said control effect has said one value.

5. A subscription receiver for utilizing an intelligence signal coded in accordance with a given coding schedule comprising: a signal reproducer; a decoding mechanism including a plurality of adjustable code-determining elements collectively determining the decoding schedule of said mechanism; means for adjusting said code-determining elements to vary the decoding schedule of said mechanism; means for applying said intelligence signal to said decoding mechanism; means for deriving a first signal representing the decoding schedule of said mechanism; means for deriving a second signal representing the coding schedule of said coded signal; means for effectively comparing said first and second signals to derive a control effect representing the state of correlation of said schedules; and means for utilizing said control effect to control the operation of said reproducer during intervals of correct correlation of said schedules.

6. A subscription receiver for utilizing an intelligence signal coded in accordance with a given coding schedule and including components related to said coding schedule comprising: a signal reproducer; a decoding mechanism including a plurality of adjustable code-determining elements collectively determining the decoding schedule of said mechanism; means for adjusting said code-determining elements to vary the decoding schedule of said mechanism; means for applying said intelligence signal to said decoding mechanism; means for deriving a first signal representing the decoding schedule of said mechanism; means responsive to said components of said coded signal for deriving a second signal representing the coding schedule of said carrier-wave signal; means for effectively comparing said first and second signals to derive a control effect representing the state of correlation of said schedules; and means for utilizing said control effect to control the operation of said reproducer during intervals of correct correlation of said schedules.

7. A subscription receiver for utilizing an intelligence signal coded in accordance with a given coding schedule comprising: a pair of signal reproducers; a decoding mechanism for controlling one of said reproducers in accordance with a received signal and including a plurality of adjustable code-determining elements collectively determining the decoding schedule of said mechanism; means for adjusting said code-determining elements to vary the decoding schedule of said mechanism; means for applying said intelligence signal to said decoding mechanism and to the other of said reproducers; means for effectively comparing the decoding schedule of said mechanism to said coding schedule of said intelligence signal to derive a control effect representing the state of correlation of said schedules; and means for utilizing said control effect to condition the other of said reproducers for operation only during intervals of correct correlation of said schedules.

8. A subscription receiver for utilizing an intelligence signal coded in accordance with a given coding schedule comprising: a signal reproducer; a decoding mechanism for controlling said reproducer in accordance with said signal and including a plurality of adjustable code-determining elements collectively determining the decoding schedule of said mechanism; means for adjusting said code-determining elements to vary the decoding schedule of said mechanism; means for applying said intelligence signal to said decoding mechanism; means for effectively comparing the decoding schedule of said mechanism to said coding schedule of said intelligence signal to derive a control effect representing the state of correlation of said schedules; and means for utilizing said control effect to permit said reproducer to operate only during intervals of correct correlation of said schedules.

9. A subscription television receiver for utilizing a received television signal having both picture and sound modulated signal components, one of said signal-components having scrambled information and the other having information coded in accordance with a given coding schedule, said receiver comprising: a first reproducer for one of said signal components and a second reproducer for the other of said signal components; an unscrambling device coupled to said one reproducer; means for applying said one signal component to said unscrambling device; a decoding mechanism coupled to said second reproducer and including a plurality of adjustable code-determining elements collectively determining the decoding schedule of said mechanism; means for adjusting said code-determining elements to vary the decoding schedule of said mechanism; means for applying said other signal component to said decoding mechanism; means for effectively comparing the decoding schedule of said mechanism to said coding schedule of said other signal to derive a control effect representing the state of correlation of said schedules; and means for utilizing said control effect to condition said first reproducer for operation only during intervals of correct correlation of said schedules.

10. A subscription television receiver for utilizing a received television signal having both picture and sound modulated signal components, said sound signal having scrambled information and said picture signal having information coded in accordance with a given coding schedule, said receiver comprising: a sound reproducer and a picture reproducer; a sound unscrambling device; means for applying said sound signal to said unscrambling device; a decoding mechanism coupled to said picture reproducer and including a plurality of adjustable code-determining elements collectively determining the decoding schedule of said mechanism; means for adjusting said code-determining elements to vary the decoding schedule of said mechanism; means for applying said picture signal to said decoding mechanism; means for effectively comparing the decoding schedule of said mechanism to said coding schedule of said picture signal to derive a control effect representing the state of correlation of said schedules; and means for utilizing said control effect to permit said sound reproducer to operate only during intervals of correct correlation of said schedules.

11. A subscription receiver for utilizing an intelligence signal coded in accordance with a given coding schedule and including components related to said coding schedule comprising: a signal reproducer; a decoding mechanism having a plurality of operating conditions and responsive to an applied control signal to selectively assume such conditions in accordance with a decoding schedule; a plurality of adjustable code-determining elements included in said mechanism collectively determining the response of said mechanism to an applied signal and, therefore, determining the decoding schedule of said mechanism; means for adjusting said code-determining elements to vary the decoding schedule of said device; means for applying said coding-schedule components of said intelligence signal to said decoding mechanism; means for deriving a first signal representing the decoding schedule of said mechanism; means responsive to said components of said carrier-wave signal for deriving a second signal representing the coding schedule of said coded signal; means for effectively comparing said first and second signals to derive a control effect representing the state of correlation of said schedules; and means for utilizing said control effect to control the operation of said reproducer only during intervals of correct correlation of said schedules.

12. A subscription receiver for utilizing an intelligence signal coded in accordance with a given coding schedule and including code-signal bursts selected from a plurality of code-signal frequencies in an order related to said coding schedule, said receiver comprising: a signal reproducer; a decoding mechanism including a signal-translating device having a series of input terminals, a series of output terminals and a plurality of selectors each of which is responsive to an assigned one of said code-signal frequencies; adjustable means for making a pattern of connections from said input to said output terminals through said selectors and for varying said pattern of connections; means for applying said coded signal to said decoding mechanism; means for deriving from said signal-translating device a first comparison signal having a waveform determined by the pattern of connections established by said adjustable means and a second signal having a waveform determined by said coding schedule of said coded signal; a comparison device for deriving a control effect in response to the application of a pair of signals; means for applying said first and second signals to said comparison device to derive a control effect during intervals in which the instantaneous polarities of the waveforms of said first and second signals have a predetermined relation to one another; and means for utilizing said control effect to control the operation of said reproducer during said intervals.

13. A subscription receiver for utilizing an intelligence signal coded in accordance with a given coding schedule and including code-signal bursts selected from a plurality of code-signal frequencies in an order related to said coding schedule, said receiver comprising: a signal reproducer; a decoding mechanism including a signal-translating device having a series of input terminals, a series of output terminals and a plurality of selectors responsive to an assigned one of said code-signal frequencies; means for making a pattern of connections from said input to said output terminals through said selectors and for varying said pattern of connections; means for applying said coded signal to said decoding mechanism; means for deriving from different ones of said output terminals of said signal-translating device a pair of comparison signals individually having a waveform determined by the pattern of connections established between said input and output terminals; a comparison device for deriving a control effect in response to the application of a pair of signals; means for applying said pair of comparison signals to said comparison device to derive a control effect during intervals in which the instantaneous polarities of the waveforms of said pair of comparison signals have a predetermined relation to one another; and means for utilizing said control effect to permit said reproducer to operate during said intervals.

14. A subscription receiver for utilizing an intelligence signal coded in accordance with a given coding schedule and including a correlation signal in the form of time-spaced bursts of a frequency selected from a plurality of coding-signal frequencies, said receiving comprising: a controlled device established in a predetermined operating condition when said coded intelligence signal is being decoded; a decoding mechanism including a decoding signal generator having a series of input circuits and further including a corresponding plurality of selectors individually responsive to one of said coding-signal frequencies; a signal comparison device; means for selectively connecting said selectors to said input circuits of said decoding signal generator and to said comparison device to determine the distribution of frequency components of an applied signal as between said input circuits and said comparison device; means for applying said intelligence signal to said decoding mechanism; means for applying said decoding signal to said comparison device to derive a control effect representing the state of correlation of said decoding signal with the signal applied to said comparison device through said selectors; and means for utilizing said control effect to establish said controlled device in said predetermined operating condition.

15. A subscription receiver for utilizing an intelligence signal coded in accordance with a given coding schedule comprising: a signal reproducer; a decoding mechanism including a plurality of adjustable code-determining elements collectively determining the decoding schedule of said mechanism; means for adjusting said code-determining elements to vary the decoding schedule of said mechanism; means for applying said intelligence signal to said decoding mechanism; a control arrangement comprising an energy-storage device, a source of unidirectional potential connected to said storage device for establishing and tending to maintain a charge in said device, and coupling means connecting said storage device to said reproducer to render said reproducer responsive only during operating intervals in which the charge of said storage device exceeds a threshold value; a signal-comparison device including a normally non-conductive electronic switch connected across said storage device and providing a discharge path therefor; means for deriving and for applying to said switch a first signal representing the decoding schedule of said mechanism; means for deriving and for applying to said switch a second signal representing said coding schedule of said coded signal to complete said discharge path during any operating interval in which said first and second signals concurrently bias said switch toward its conductive state.

16. A subscription receiver for utilizing an intelligence signal coded in accordance with a given coding schedule and including correlation components related to said coding schedule comprising: a signal reproducer; a decoding mechanism having a plurality of operating conditions and responsive to an applied control signal to selectively assume such conditions in accordance with a decoding schedule; a plurality of adjustable code-determining elements included in said mechanism collectively determining the response of said mechanism to an applied signal and, therefore, determining the decoding schedule of said mechanism; means for adjusting said code-determining elements to vary the decoding schedule of said device; means for applying said coding-schedule components of said intelligence signal to said decoding mechanism; means for deriving a first signal representing the changes in operating condition and, therefore, the decoding schedule of said mechanism; means responsive to said correlation components for deriving a second signal representing operating intervals in which said mechanism is required to be a predetermined one of its said operating conditions; means for effectively comparing said first and second signals to derive a control effect representing the state of correlation of said schedules; and means for utilizing said control effect to control the operation of said reproducer during intervals of correct correlation of said schedules.

17. A subscription receiver for utilizing an intelligence signal coded in accordance with a given coding schedule comprising: a use meter; a decoding mechanism including a plurality of signal-translating elements adjustable relative to one another; means for applying said coded signal to said decoding mechanism; means for deriving a first comparison signal having a waveform determined by the adjustment of said signal-translating elements and for deriving a second signal having a waveform determined by said coding schedule of said coded signal; a comparison device for deriving a control effect in response to the application of a pair of signals; means for applying said first and second signals to said comparison device to derive a control effect during intervals in which the instantaneous polarities of the waveform of said first and second signals have a predetermined relation to one another; and means for utilizing said control effect to actuate said use meter.

18. A secrecy communication receiver comprising: means for deriving a code signal having a characteristic representing a given code pattern; decoding apparatus coupled to said deriving means and including a plurality of adjustable code-determining elements to be adjusted relative to one another in accordance with said code pattern; means for effectively comparing the instantaneous adjustment of said code-determining elements with said code pattern to derive a control effect indicating the correlation status therebetween; a signal-translating device having a plurality of operating conditions, a predetermined one of which conditions represents a correct correlation status between the adjustment of said code-determining elements and said code pattern; and means for utilizing said control effect to actuate said signal-translating device to said predetermined operating condition in response to a condition of correct correlation.

19. A secrecy communication receiver for utilizing an intelligence signal coded in accordance with a given code schedule, comprising: decoding apparatus including a plurality of adjustable code-determining elements to be adjusted relative to one another in accordance with a pattern dictated by said given code schedule in order to achieve decoding of said intelligence signal; means for effectively comparing the instantaneous adjustment of said code-determining elements with said given code schedule to derive a control effect indicating the correlation status therebetween; a signal-translating device having a plurality of operating conditions, a predetermined one of which conditions represents a correct correlation status between the adjustment of said code-determining elements and said given code schedule; and means for utilizing said control effect to actuate said signal-translating device to said predetermined operating condition in response to a condition of correct correlation.

20. A secrecy communication receiver comprising: means for deriving a code signal having a characteristic representing a given code pattern; decoding apparatus coupled to said deriving means and including a plurality of adjustable code-determining elements to be adjusted relative to one another in accordance with said code pattern; means for deriving a pair of comparison signals having wave forms respectively determined by the adjustment of said code-determining elements and by said code pattern; a comparison device responsive to said comparison signals for effectively comparing the instantaneous adjustment of said code-determining elements with said code pattern to derive a control effect indicating the correlation status therebetween; a signal-translating device having a plurality of operating conditions, a predetermined one of which conditions represents a correct correlation status between the adjustment of said code-determining elements and said code pattern; and means for utilizing said control effect to actuate said signal-translating device to said predetermined operating condition in response to a condition of correct correlation.

21. A secrecy communication receiver for utilizing a scrambled intelligence signal and a code signal having a characteristic representing a given code pattern, comprising: decoding apparatus including a plurality of adjustable code-determining elements to be adjusted relative to one another in accordance with said code pattern; means, independent of said decoding apparatus, for effectively comparing the instantaneous adjustment of said code-determining elements with said code pattern to derive a control effect indicating the correlation status therebetween; an unscrambling device, independent of said decoding apparatus, for unscrambling said intelligence signal; and means for utilizing said control effect to permit said unscrambling device to unscramble said intelligence signal in response to a condition of correct correlation between the adjustment of said code-determining elements and said code pattern.

22. A secrecy communication receiver comprising: means for deriving a code signal having a characteristic representing a given code pattern; decoding apparatus coupled to said deriving means, including a plurality of adjustable code-determining elements to be adjusted relative to one another in accordance with said code pattern, and selectively operable in one of a plurality of different operating conditions as determined, at least partially, by the instantaneous adjustment of said code-determining elements; means for effectively comparing the instantaneous adjustment of said code-determining elements with said code pattern to determine if said decoding apparatus is established during a particular interval, determined by said code pattern, in a certain operating condition, thereby to determine the correlation status between the adjustment of said code-determining elements and said code pattern; means for deriving from said comparing means a control effect indicating said correlation status; a signal-translating device having a plurality of operating conditions, a predetermined one of which conditions represents a correct correlation status between the adjustment of said code-determining elements and said code pattern; and means for utilizing said control effect to actuate said signal-translating device to its aforesaid predetermined operating condition in response to a condition of correct correlation.

23. A secrecy communication receiver comprising: means for deriving a code signal having a characteristic representing a given code pattern; decoding apparatus coupled to said deriving means and including a plurality of adjustable code-determining elements to be adjusted relative to one another in accordance with said code pattern; a multi-condition mechanism having first and second operating conditions respectively indicating correct and incorrect conditions of correlation between said code pattern and the instantaneous adjustment of said code-determining elements; means coupled to said decoding apparatus for establishing said mechanism in its first operating condition responsive to a correct correlation status between the adjustment of said code-determining elements and said code pattern; means for deriving from said mechanism a control effect indicating the correlation status; a controlled device having a plurality of operating conditions, a predetermined one of which conditions represents a correct correlation status between the adjustment of said code-determining elements and said code pattern; and means for utilizing said control effect to actuate said controlled device to said predetermined operating condition in response to a condition of correct correlation.

24. A secrecy communication receiver comprising: means for deriving a code signal having a characteristic representing a given code pattern; decoding apparatus coupled to said deriving means and including a plurality of adjustable code-determining elements to be adjusted relative to one another in accordance with said code pattern; means for effectively comparing the instantaneous adjustment of said code-determining elements with said code pattern to derive a control effect indicating the correlation status therebetween; a charge register; and means for utilizing said control effect to actuate said charge register in response to a condition of correct correlation.

25. A secrecy communication receiver for utilizing an intelligence signal, comprising: means for deriving a code signal having a characteristic representing a given code pattern; decoding apparatus coupled to said deriving means and including a plurality of adjustable code-determining elements to be adjusted relative to one another in accordance with said code pattern; sensing means, independent of said decoding apparatus, for comparing the instantaneous adjustment of said code-determining elements with said code pattern to derive a control effect indicating the correlation status therebetween; a controlled device having a predetermined operating condition when said intelligence signal is being utilized; and means for utilizing said control effect to actuate said controlled device to said predetermined operating condition in response to a condition of correct correlation between the adjustment of said code-determining elements and said code pattern.

26. A secrecy communication receiver for utilizing an intelligence signal received throughout a program interval, comprising: means for deriving a code signal having a characteristic representing a given code pattern; decoding apparatus coupled to said deriving means and including a plurality of adjustable code-determining elements to be adjusted relative to one another, prior to said program interval, in accordance with said code pattern; means for effectively comparing the instantaneous adjustment of said code-determining elements with said code pattern to derive a control effect indicating the correlation status therebetween; a controlled device having a predetermined operating condition when said intelligence signal is being utilized; and means for utilizing said control effect to actuate said controlled device to said predetermined operating condition in response to a condition of correct correlation between the adjustment of said code-determining elements and said code pattern and to effectively sustain said controlled device in said predetermined operating condition throughout said program interval.

27. A secrecy communication receiver for utilizing an intelligence signal, comprising: means for deriving a code signal having a characteristic representing a given code pattern; decoding and reproducing means, including a plurality of adjustable code-determining elements to be adjusted relative to one another in accordance with said code pattern, for responding to said code signal and for intelligibly reproducing said intelligence signal; means for effectively comparing the instantaneous adjustment of said code-determining elements with said code pattern to derive a control effect indicating the correlation status therebetween; and means for utilizing said control effect to condition said decoding and reproducing means, only during intervals of correct correlation between the adjustment of said code-determining elements and said code pattern, to achieve intelligible reproduction of said intelligence signal.

28. A secrecy communication receiver comprising: signal-generating apparatus, including a plurality of adjustable code-determining elements to be adjusted in accordance with a predetermined adjustment, for developing a comparison signal having a characteristic determined, at least in part, by the instantaneous adjustment of said code-determining elements; means responsive to said comparison signal for effectively comparing the instantaneous adjustment of said code-determining elements with said predetermined adjustment to derive a control effect indicating the correlation status therebetween; a controlled device; and means for utilizing said control effect to establish said controlled device in a predetermined operating condition during intervals in which said code-determining elements are adjusted in accordance with said predetermined adjustment.

29. A secrecy communication receiver comprising: signal-generating apparatus, including a plurality of adjustable code-determining elements to be adjusted in accordance with a predetermined adjustment, for developing a comparison signal having a characteristic determined, at least in part, by the instantaneous adjustment of said code-determining elements; means responsive to said comparison signal for effectively comparing the instantaneous adjustment of said code-determining elements with said predetermined adjustment to derive a control effect indicating the correlation status therebetween; a signal reproducer; and means for utilizing said control effect to effectively control said reproducer.

30. A secrecy communication receiver comprising: signal-generating apparatus, including a plurality of adjustable code-determining elements to be adjusted in accordance with a predetermined adjustment, for developing a comparison signal having a characteristic determined, at least in part, by the instantaneous adjustment of said code-determining elements; means responsive to said comparison signal for effectively comparing the instantaneous adjustment of said code-determining elements with said predetermined adjustment to derive a control effect indicating the correlation status therebetween; a charge register; and means for utilizing said control effect to actuate said charge register in response to a condition of correct correlation.

No references cited.

Notice of Adverse Decisions in Interferences

In Interference No. 94,050 involving Patent No. 3,011,016, E. M. Roschke, SUBSCRIPTION RECEIVER, final judgment adverse to the patentee was rendered July 28, 1967, as to claim 27.

[*Official Gazette March 6, 1973.*]

Disclaimer 3,011,016.—*Erwin M. Roschke*, Des Plaines, Ill. SUBSCRIPTION RECEIVER. Patent dated Nov. 28, 1961. Disclaimer filed Jan. 25, 1971, by, the assignee, *Zenith Radio Corporation.*

Hereby enters this disclaimer to claim 27 of said patent.

[*Official Gazette April 29, 1975.*]